United States Patent [19]
Post

[11] Patent Number: 5,286,113
[45] Date of Patent: Feb. 15, 1994

[54] CENTRIFUGALLY ACTIVATED BEARING FOR HIGH-SPEED ROTATING MACHINERY

[75] Inventor: Richard F. Post, Walnut Creek, Calif.

[73] Assignee: The United States of American as represented by the United States Department of Energy, Washington, D.C.

[21] Appl. No.: 39,678

[22] Filed: Mar. 30, 1993

[51] Int. Cl.⁵ .................. F16C 21/00; F16C 41/00
[52] U.S. Cl. .................................. 384/100; 384/102; 384/627
[58] Field of Search ............... 384/100, 101, 102, 193, 384/226, 227, 234, 624, 627

[56] References Cited

U.S. PATENT DOCUMENTS

| | | |
|---|---|---|
| 1,175,415 | 3/1916 | Egbert . |
| 1,757,585 | 5/1930 | Orr . |
| 2,068,458 | 1/1937 | Moller . |
| 2,474,072 | 6/1949 | Stoner ........................... 74/5.7 |
| 3,454,309 | 7/1969 | Ingham et al. . |
| 3,503,269 | 3/1970 | O'Connor .................. 384/101 X |
| 3,765,735 | 10/1973 | Bourgain et al. ............... 384/193 |
| 3,854,781 | 12/1974 | Bildtsén ....................... 384/102 |
| 4,177,884 | 12/1979 | Vinten ...................... 384/234 X |
| 4,641,978 | 2/1987 | Kapich ......................... 384/102 |
| 4,683,111 | 7/1987 | Helm et al. .................... 376/391 |
| 4,927,274 | 5/1990 | Smith ........................... 384/101 |
| 5,021,697 | 6/1991 | Kralick ........................ 310/90.5 |

FOREIGN PATENT DOCUMENTS 2658925 12/1976 Fed. Rep. of Germany .

OTHER PUBLICATIONS

"A High Efficiency Electromechanical Battery," by Richard F. Post, T. Kenneth Fowler, and S. F. Post (The Proceedings of the IEEE), pp. 1–81, Jun. 11, 1992.

Primary Examiner—Thomas R. Hannon
Attorney, Agent, or Firm—Miguel A. Valdes; Roger S. Gaither; William R. Moser

[57] ABSTRACT

A centrifugally activated bearing is disclosed. The bearing includes an annular member that extends laterally and radially from a central axis. A rotating member that rotates about the central axis relative to the annular member is also included. The rotating member has an interior chamber that surrounds the central axis and in which the annular member is suspended. Furthermore, the interior chamber has a concave shape for retaining a lubricant therein while the rotating member is at rest and for retaining a lubricant therein while the rotating member is rotating. The concave shape is such that while the rotating member is rotating a centrifugal force causes a lubricant to be forced away from the central axis to form a cylindrical surface having an axis collinear with the central axis. This centrifugally displaced lubricant provides restoring forces to counteract lateral displacement during operation.

15 Claims, 4 Drawing Sheets

CENTRIFUGALLY ACTIVATED BEARING FOR HIGH-SPEED ROTATING MACHINERY

BACKGROUND OF THE INVENTION

The United States Government has rights in this invention pursuant to Contract No. W-7405-ENG-48 between the United States Department of Energy and the University of California for the operation of Lawrence Livermore National Laboratory.

1. Field of the Invention

The present invention relates to bearing systems, and more particularly, to centrifugally activated bearings.

2. Description of the Related Art

High speed rotating structures, such as motors, generators, turbines, and the like, include bearings that provide an interface between the stationary and rotating members. Conventional mechanical bearings, such as ball bearings, suffer from the disadvantage that they are prone to excessive wear. The wear results from the friction produced by the metal-metal contact.

There have been several attempts to produce a frictionless bearing, i.e., a bearing having no metal-metal contact. One such frictionless bearing is the magnetic bearing. A magnetic bearing uses two magnets as the interface between the stationary and rotating members. One magnet is secured to the stationary member, and the other magnet is secured to the rotating member.

When two magnetic bearings are mounted at opposite ends of the axis of rotation of a rotating member, the rotating member is suspended and held in position by the magnetic forces of the magnets. Although each of the magnets in the magnetic bearings are very close together, there is no physical contact between the stationary and rotating members. Thus, there can be no friction.

While magnetic bearings can support a load without friction, they often require axial stabilization to be operative. This stability problem has conventionally been solved in two ways. First, some form of a mechanical "back-up" bearing can be used to provide a relatively weak stabilizing force. While a mechanical back-up bearing solves the stability problem, it has the disadvantage of introducing friction into the bearing system.

The second stabilization technique is to use sensors and electronic feedback circuits to introduce stabilizing forces in the magnets of the magnetic bearings by controlling the currents in the magnetic windings. This technique suffers from the disadvantage of requiring complicated electrical circuitry.

Thus, there is a need for a frictionless or near frictionless bearing that overcomes the problems associated with conventional frictionless bearings. Furthermore, there is a need for a frictionless or near frictionless bearing that may be used as a back-up or stabilizing bearing for a conventional magnetic bearing.

SUMMARY OF THE INVENTION

The present invention provides a centrifugally activated bearing. The bearing includes an annular member that protrudes laterally and radially from a central axis. A rotating member that rotates about the central axis relative to the annular member is also included. The rotating member has an interior chamber that surrounds the central axis and in which the annular member is suspended. Furthermore, the interior chamber has a concave shape for retaining a lubricant therein while the rotating member is at rest and for retaining a lubricant therein while the rotating member is rotating. The concave shape is such that while the rotating member is rotating a centrifugal force causes a lubricant to be forced away from the central axis to form a cylindrical surface having an axis collinear with the central axis.

A better understanding of the features and advantages of the present invention will be obtained by reference to the following detailed description of the invention and accompanying drawings which set forth an illustrative embodiment in which the principles of the invention ar utilized.

DETAILED DESCRIPTION OF THE PREFERRED EMBODIMENTS

Figure 1:
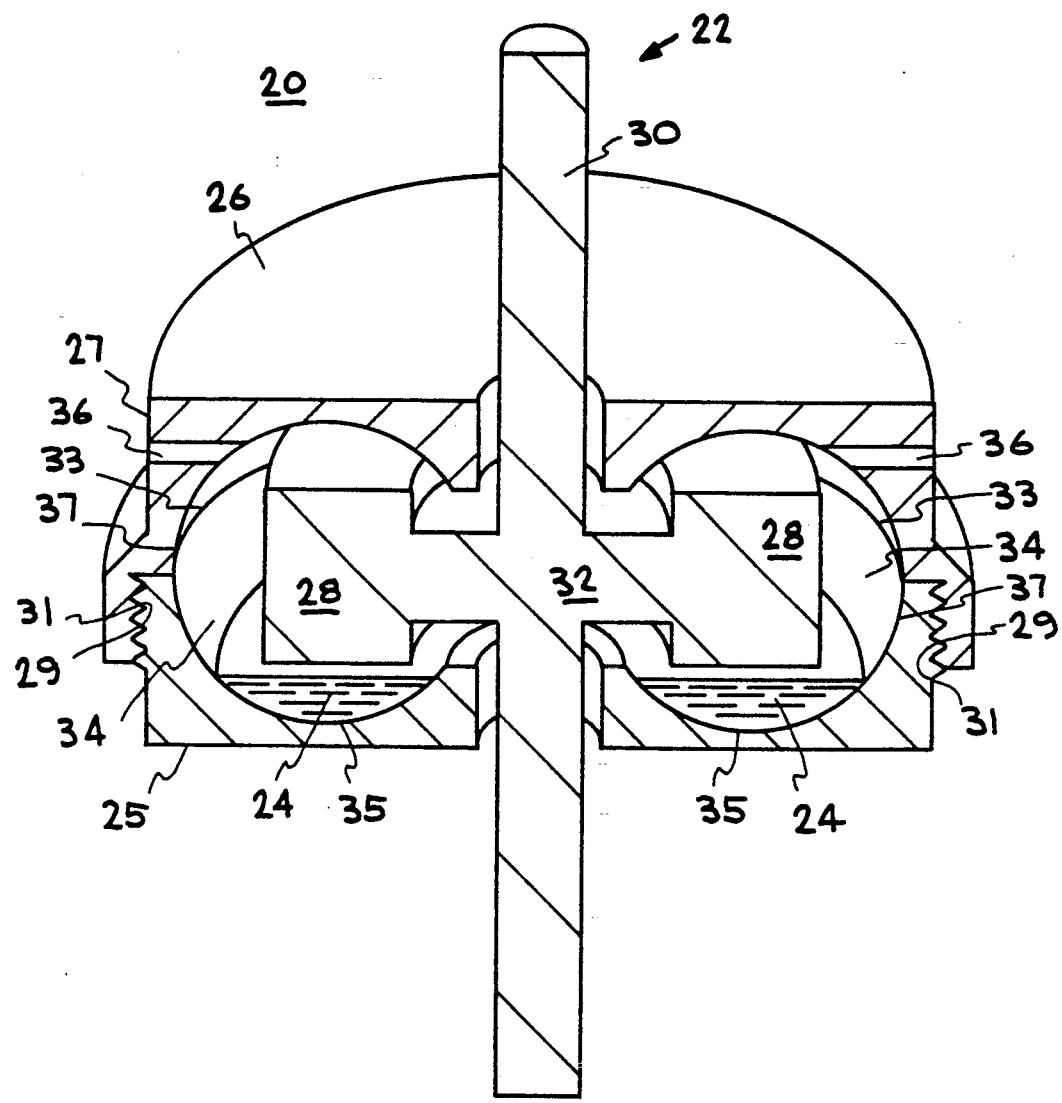
FIG. 1 is a perspective, cross-sectional view of one embodiment of a centrifugally activated bearing in accordance with the present invention.

Referring to FIG. 1, there is illustrated a centrifugally activated bearing 20 in accordance with the present invention. The bearing 20 is suitable for use with vertical-axis high-speed rotating machinery operating in vacuo (for example an energy storage rotor). The bearing 20 derives its centering force from the interaction of a stationary member 22 and the surface of a lubricant 24 held contained by centrifugal forces in an outer rotating member 26.

Specifically, an annular member 28 surrounds an elongate shaft 30. The longitudinal axis of the shaft 30 should be positioned approximately perpendicular to the annular member 28 such that the annular member 28 protrudes laterally and radially from the shaft 30. Although the annular member 28 preferably has a rectangular cross-section as shown in FIG. 1, it is believed that the bearing 20 can be adapted to function properly with differently shaped annular members 28, such as a circular, semi-circular, oval, triangular, etc.

The shaft 30 should be rigidly secured to the annular member 28 approximately at its center. As shown in FIG. 1, the annular member 28 is secured to the shaft 30 by means of securing member 32. As illustrated, the shaft 30, annular member 28, and securing member 32 are constructed from a single piece of metal. It should be understood, however, that the annular member 28 and shaft 30 may be separate components; in this scenario the annular member 28 may be secured to the shaft 30 by any one of several alternative methods. An example of one such alternative method is a plurality spokes extending from the shaft 30 to the annular member 28.

The rotating member 26 rotates about the longitudinal axis of the shaft 30 relative to the annular member 28. An interior chamber 34 inside the rotating member 26 surrounds the longitudinal axis of the shaft 30. The annular member 28 is suspended wholly within the interior chamber 34. Although the interior chamber 34 preferably has a nearly circular cross-section as illustrated in FIG. 1, the only requirement is that the interior chamber 34 have some type of concave shape for retaining the lubricant 24 therein while the rotating member 26 is at rest and for retaining the lubricant 24 therein while the rotating member 26 is rotating. For example, the interior chamber 34 may have a concave shape on the surface 35 perpendicular to the longitudinal axis of the shaft 30 and a concave shape on the surface 37 parallel to the longitudinal axis of the shaft 30.

In order to manufacture the centrifugally activated bearing 20, the rotating member 26 may include an upper-half 27 and a separate lower-half 25. During assembly, the stationary member 22 is first inserted into the lower-half 25, the lubricant 24 is placed in the lower-half 25, and then the upper-half 27 is fastened to the lower-half 25.

The upper-half 27 may be fastened to the lower-half 25 in a number of different ways. For example, as shown in FIG. 1, the upper-half 27 may be screwed on to the lower-half 25 by means of threads 29 located around the perimeter of the upper-half 27. Complimentary threads 31 around the perimeter of the lower-half 25 engage the threads 29. Alternatively, the upper-half 27 may be fastened to the lower-half 25 by means of several doll-rod like bolts (not shown) which are anchored in the upper-half 27, extend across the seem 33, and are anchored in the lower-half 25.

The upper-half 27 of the rotating member 26 may include a plurality of venting holes 36 for maintaining a predetermined quantity of lubricant 24 in the rotating member 26. The venting holes 36, which are optional, are discussed in detail below.

It is envisioned that the shaft 30 may not even be needed if the annular member 28 can be rigidly secured to some other structure, such as a configuration of metal framework, or the like. In this scenario, the rotating member 26 would rotate about a central axis running through the center of the annular member rather than the shaft 30.

Figure 2:
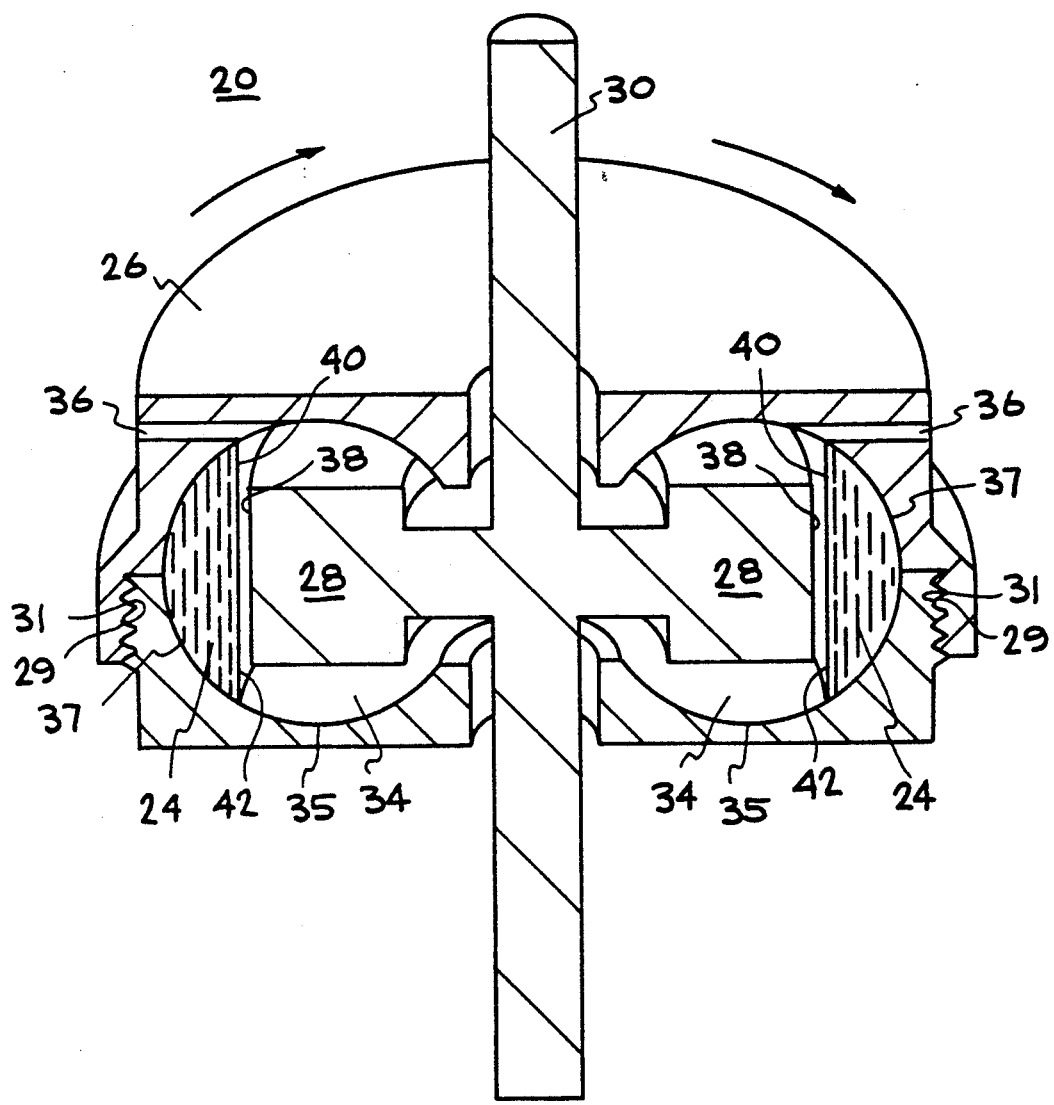
FIG. 2 is a perspective, cross-sectional view depicting the centrifugally activated bearing of FIG. 1 while the rotating member is rotating.

When the rotating member 26 is at rest, the lubricant 24 lies in a pool at the bottom of interior chamber 34. Referring to FIG. 2, when the rotating member 26 rotates, centrifugal force causes the lubricant 24 to move up the sides of the interior chamber 34, i.e., from a horizontal position to a vertical position. The lubricant 24 forms a cylindrical surface within the interior chamber 34 having an axis corresponding to the axis of rotation. The radius of the cylindrical surface may be equal to or slightly larger than the outer radius of the annular member 28. If the radius of the cylindrical surface is equal to the outer radius of the annular member 28, the lubricant 24 will be in constant contact with the annular member 28. If the radius is slightly larger, there will be a small space between the lubricant 24 and the annular member 28.

If the rotating member 26 encounters lateral forces while it is rotating, the surface of the lubricant 24 comes into contact with the outer surface 38 of the annular member 28. If the outer surface 38 is already in contact with the lubricant 24, the contact becomes more forceful. When the contact between the annular member 28 and lubricant 24 becomes more forceful, some of the lubricant is displaced. This displacement forces the surfaces 40 and 42 of the lubricant 24 that lie above and below the annular member 28 to move inward against the centrifugal force.

The action that results from the displaced lubricant 24 resembles the buoyancy of an object floating in a liquid. The floating object is supported against gravity by the hydrostatic pressure exerted on its surface by the liquid. With respect to the centrifugally activated bearing 20, however, the gradient of the restoring force can be very large because it is derived from a centrifugal force field rather than from a gravitational field. The acceleration of the centrifugal force field may be hundreds of thousands times greater than the acceleration of gravity.

An analysis of the centrifugal and hydrostatic forces on the annular member 28 yields a simple approximate equation for the restoring force of the bearing 20. The restoring force is a function of system parameters and the displacement $\Delta r$ (into the lubricant 24 surface) of the annular member 28. The equation is:

$$F_r = (\pi^2 \rho r^2 \omega^2 h) \Delta r$$

In this equation, $\rho$ is the density of the lubricant 24, $r$ is the inner radius of the surface of the lubricant 24 as dictated by its volume and by the centrifugal force field, $\omega$ is the rotation speed (radians per second) of the rotating member 26, and $h$ is the vertical height of the outer radius of the annular member 28.

Representative system parameters for a small high-speed energy storage rotor are as follows:

$h = 1.0$ cm.

$r = 2.0$ cm.

$\rho = 1.0$ gm/cm$^3$ $\omega = 2\pi \times 3.3 \times 10^3$ radians per second (200,000 RPM)

Substituting these representative system parameters into the above equation results in the following restoring force (with $\Delta r$ given in centimeters):

$$F_r = 1.7 \times 10^4 \, (\Delta r) \text{ kilograms}$$

This restoring force corresponds to a very "stiff" response, approaching that of a solid surface.

The lubricant 24 may be either an oil-like liquid or a grease-like material. A grease-like material would flow under the influence of the centrifugal force field. In either form the lubricant 24 can be selected to have low vapor pressure at normal operating temperatures so that the bearing 20 can be used in a high vacuum environment. Furthermore, the centrifugal force field would likely have the effect of further reducing the rate of evaporation of the lubricant from its free surface because the centrifugal force would add to the energy required for the molecules to escape from the surface.

The venting holes 36 may be placed in the interior chamber 34 so as to set the volume of the lubricant 24 to the desired level. The clearance between the outer surface 38 of the annular member 28 and the surface of the lubricant 24 can be adjusted by adjusting the volume of the lubricant 24. Thus, the venting holes should be positioned such that excess lubricant above the desired level will be spun out of the interior chamber 34.

Because the centrifugally activated bearing 20 includes the inner annular member 28 that does not ordinarily physically contact the surrounding outer rotating member 26, it initially appears to be a type of journal bearing. Most conventional journal bearings include an inner rotor that rotates and an outer stator (or housing) that remains stationary. One primary difference between the centrifugally activated bearing 20 and conventional journal bearings is that it is the outer rotating member 26 that rotates and the inner annular member 28 that is stationary in the centrifugally activated bearing 20.

Figure 3:
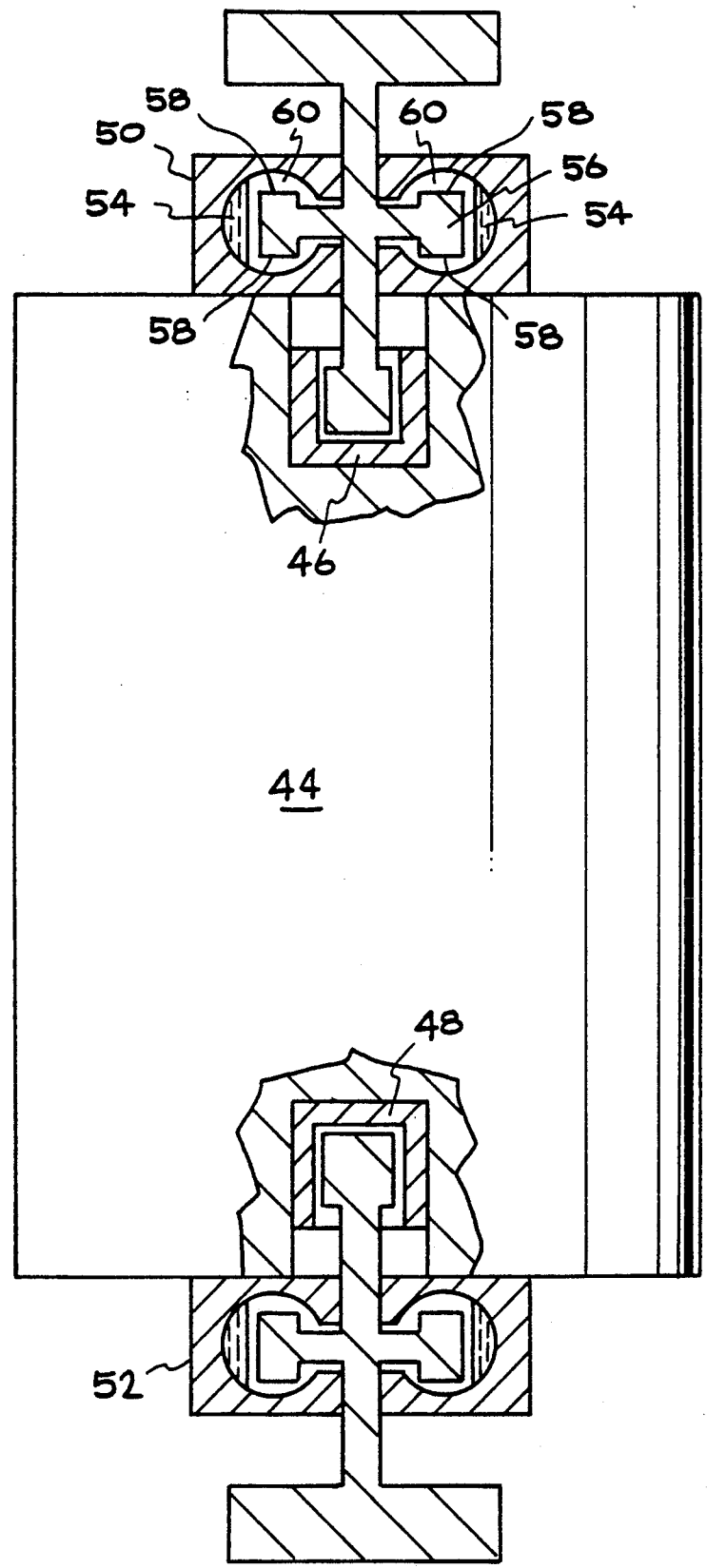
FIG. 3 is a cross-sectional view of two centrifugally activated bearings in accordance with the present invention being used as back-up bearings for two magnetic bearings.

FIG. 3 illustrates one particular application of the centrifugally activated bearing. There is illustrated a high-speed vertical-axis rotor 44 that utilizes two magnetic bearings 46 and 48 to support it against gravity and to provide centering forces in normal operation. Two centrifugally activated bearings 50 and 52 function as "backup" bearings for the magnetic bearings 46 and 48. When used as backup bearings, the volume of lubricant 54 is adjusted so that there is normally no contact between the outside surface of the annular member 56 and the surface of the lubricant 54. However, when there are unusually large accelerations transverse to the axis of the rotor 44, or in the event of failure of the magnetic bearings 46 and 48, the centrifugally activated backup bearings 50 and 52 would come into play to insure adequate centering of the rotor 44.

It is envisioned that the centrifugally activated backup bearing concept could also provide restraint from momentary axial displacements resulting from transient vertical accelerations that might exceed the capacity of the magnetic bearings 46 and 48. For example, this restraint may be provided by the horizontal surfaces 58 of the annular member 56 coming into physical contact with the upper or lower walls of the interior chamber 60. Because this contact will be unlubricated contact, it preferably will be only momentary contact.

Figure 4:
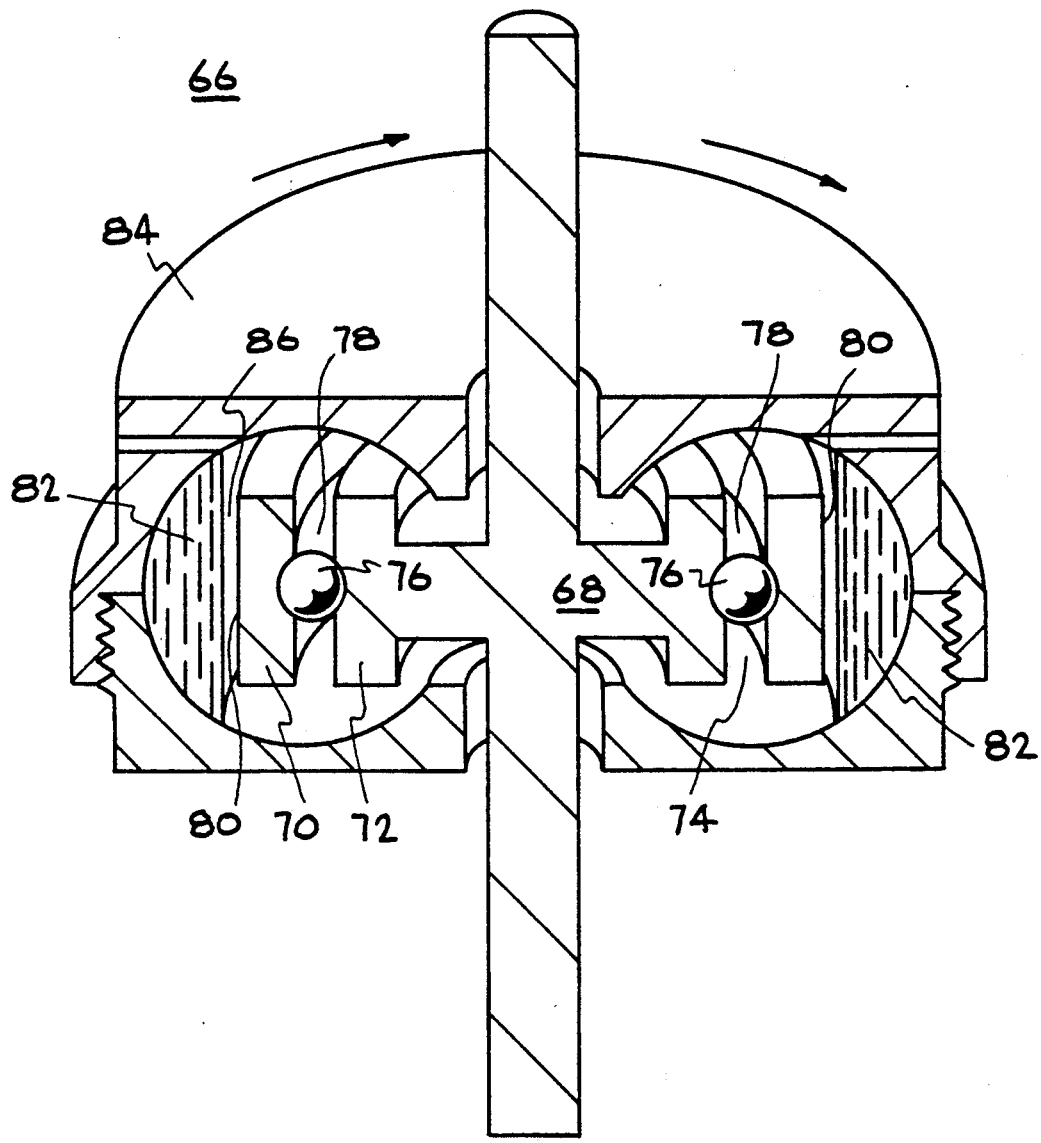
FIG. 4 is a perspective, cross-sectional view of an alternative embodiment of a centrifugally activated bearing in accordance with the present invention.

Referring to FIG. 4, there is illustrated an alternative embodiment of a centrifugally activated bearing 66 in accordance with the present invention. The primary difference between the bearing 66 and the bearing 20 of FIGS. 1 and 2 is that the annular member 68 includes two separate pieces, namely, an outer annular member 70 and an inner annular member 72. The outer annular member 70 and the inner annular member 72 are sized to rotate with respect to each other, and a gap 74 therebetween contains bearings 76 which facilitate such rotation. Grooves 78 are formed in the annular members 70 and 72 for receiving the bearings 76.

An advantage of using the two piece annular member 68 is that when the outer side 80 of the outer annular member 70 makes contact with the lubricant 82, such contact creates a smaller amount of drag on the rotating member 84 than the drag created on the rotating member 26 shown in FIG. 2. Specifically, when the one-piece annular member 28 of FIG. 2 makes contact with the lubricant 24, the friction caused between the lubricant 24 and the annular member 28 tends to increase the drag on the rotating member 26 because the annular member 28 remains stationary. However, when the outer annular member 70 shown in FIG. 4 makes contact with the lubricant 82, the outer annular member 70 is capable of rotating along with the rotating member 84 with respect to the inner annular member 72. Because the outer annular member 70 tends to rotate with the rotating member 84, there is less drag on the rotating member 84.

The smaller amount of drag created by the two-piece annular member 68 permits the use of a larger quantity of lubricant 82 such that the outer annular member 70 is always in contact with the lubricant 82. The advantage of having the lubricant 82 in constant contact with the outer annular member 70 is that the rotating member 84 is subject to less lateral movement because it is held tightly against the annular member 68. However, using the bearing 66 in this manner, i.e., with the lubricant 82 in constant contact with the outer annular member 70, is optional. The bearing 66 will function adequately if there is a small space 86 between the lubricant 82 and the outer annular member 70.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A centrifugally activated bearing, comprising:
    an annular member protruding laterally and radially from a central axis; and
    a rotating member for rotation about the central axis relative to the annular member, the rotating member having an interior chamber surrounding the central axis, the annular member being suspended wholly within the interior chamber, the interior chamber having a concave shape on the surface perpendicular to the central axis for retaining a lubricant therein while the rotating member is at rest and having a concave shape on the surface parallel to the central axis for retaining a lubricant therein while the rotating member is rotating, the concave shape being such that while the rotating member is rotating a centrifugal force causes a lubricant to be forced away from the central axis to form a cylindrical surface within the interior chamber having an axis collinear with the central axis.

2. The centrifugally activated bearing of claim 1, further comprising:
    an elongate shaft being positioned collinear with the central axis and rigidly secured to the annular member approximately at its center.

3. The centrifugally activated bearing of claim 1, wherein the annular member is a two-piece annular member having an outer annular member that surrounds and is capable of rotating with respect to an inner annular member.

4. The centrifugally activated bearing of claim 1, wherein the annular member has a rectangular cross-section.

5. The centrifugally activated bearing of claim 1, wherein the interior chamber has an at least partially circular cross-section.

6. The centrifugally activated bearing of claim 1, wherein the rotating member has a plurality of venting holes in the interior chamber for maintaining a predetermined quantity of lubricant in the rotating member.

7. A centrifugally activated bearing, comprising:
    an elongate shaft having a longitudinal axis;
    an annular member protruding laterally and radially from the shaft, the shaft being rigidly secured to the annular member approximately at its center; and
    a rotating member for rotation about the longitudinal axis of the shaft relative to the annular member, the rotating member having an interior chamber surrounding the shaft, the annular member being suspended wholly within the interior chamber, the interior chamber having a concave shape on the surface perpendicular to the longitudinal axis of the shaft for retaining a lubricant therein while the rotating member is at rest and having a concave shape on the surface parallel to the longitudinal axis of the shaft for retaining a lubricant therein while the rotating member is rotating, the concave shape being such that while the rotating member is rotating a centrifugal force causes a lubricant to be forced away from the elongate shaft to form a cylindrical surface within the interior chamber having an axis collinear with the elongate shaft.

8. The centrifugally activated bearing of claim 7, wherein the annular member is a two-piece annular member having an outer annular member that surrounds and is capable of rotating with respect to an inner annular member.

9. The centrifugally activated bearing of claim 7, wherein the annular member has a rectangular cross-section.

10. The centrifugally activated bearing of claim 7, wherein the interior chamber has an at least partially circular cross-section.

11. The centrifugally activated bearing of claim 7, wherein the rotating member has a plurality of venting holes in the interior chamber for maintaining a predetermined quantity of lubricant in the rotating member.

12. A centrifugally activated bearing, comprising:
an elongate shaft having a longitudinal axis;
an annular member having a rectangular cross-section, the annular member surrounding the shaft in an approximately perpendicular relationship thereto;
securing means for rigidly securing the shaft to the annular member approximately at its center; and
a rotating member for rotation about the longitudinal axis of the shaft relative to the annular member, the rotating member having an interior chamber surrounding the shaft, the annular member being suspended wholly within the interior chamber, the interior chamber having a concave shape on the surface perpendicular to the longitudinal axis of the shaft for retaining a lubricant therein while the rotating member is at rest and having a concave shape on the surface parallel to the longitudinal axis of the shaft for retaining a lubricant therein while the rotating member is rotating, the concave shape being such that while the rotating member is rotating a centrifugal force causes a lubricant to be forced away from the elongate shaft to form a cylindrical surface within the interior chamber having an axis collinear with the elongate shaft.

13. The centrifugally activated bearing of claim 12, wherein the annular member is a two-piece annular member having an outer annular member that surrounds and is capable of rotating with respect to an inner annular member.

14. The centrifugally activated bearing of claim 12, wherein the interior chamber has an at least partially circular cross-section.

15. The centrifugally activated bearing of claim 12, wherein the rotating member has a plurality of venting holes in the interior chamber for maintaining a predetermined quantity of lubricant in the rotating member.

* * * * *